(12) United States Patent
Bloebaum et al.

(10) Patent No.: US 6,433,735 B1
(45) Date of Patent: Aug. 13, 2002

(54) MOBILE TERMINAL AND SYSTEM AND METHOD FOR DETERMINING THE GEOGRAPHIC LOCATION OF A MOBILE TERMINAL

(75) Inventors: L. Scott Bloebaum, Cary; David McMahan, Raleigh, both of NC (US)

(73) Assignee: Telefonaktiebolaget (LME), Stockholm (SE)

( * ) Notice: Subject to any disclaimer, the term of this patent is extended or adjusted under 35 U.S.C. 154(b) by 0 days.

(21) Appl. No.: 09/748,368

(22) Filed: Dec. 26, 2000

(51) Int. Cl.[7] .............................. G01S 5/02; H04B 7/185
(52) U.S. Cl. ........................ 342/357.1; 342/357.06; 342/357.13
(58) Field of Search ................ 342/357.01, 357.06, 342/357.1, 357.13, 457; 455/422, 456; 701/213, 215

(56) References Cited

U.S. PATENT DOCUMENTS

| | | | |
|---|---|---|---|
| 5,365,450 A | 11/1994 | Schuchman et al. | 364/449 |
| 5,519,621 A * | 5/1996 | Wortham | 364/460 |
| 5,663,734 A | 9/1997 | Krasner | 342/357 |
| 5,874,914 A | 2/1999 | Krasner | 342/357 |
| 5,884,214 A | 3/1999 | Krasner | 701/207 |
| 5,918,176 A * | 6/1999 | Arrington et al. | 455/430 |
| 6,026,305 A * | 2/2000 | Salinger et al. | 455/456 |
| 6,148,202 A * | 11/2000 | Wortham | 455/434 |
| 6,246,882 B1 * | 6/2001 | Lachance | 455/456 |

* cited by examiner

*Primary Examiner*—Dao Phan
(74) *Attorney, Agent, or Firm*—Coats & Bennett, P.L.L.C.

(57) ABSTRACT

A mobile terminal and system and method for determining the geographic location of the mobile terminal. A current cell identification number is determined for a cell in which the mobile terminal is located. The geographic location of the mobile terminal is determined based on data including at least one geographic position stored in a database and associated in the database with data representing the current cell identification number. The database may be updated with the geographic location and the current cell identification number.

62 Claims, 5 Drawing Sheets

MOBILE TERMINAL AND SYSTEM AND METHOD FOR DETERMINING THE GEOGRAPHIC LOCATION OF A MOBILE TERMINAL

BACKGROUND OF THE INVENTION

This invention relates to a mobile terminal including geo-location capabilities, and to a system and method system for determining the geographic location of a mobile terminal.

Increasingly, mobile terminals are equipped with positioning receivers that derive geographic position information from external sources, e.g. a satellite or radio network. Precise location information is useful for a variety purposes in connection with a mobile terminal. The location of the mobile terminal may, for example, be used in determining the billing rate for a particular telephone call based on a user's calling plan. Location information is also useful in connection with a variety of ancillary services, such as locating a user for providing emergency medical assistance, e.g. in connection with a 911 emergency call, or providing location information for nearby facilities such as gas stations, hotels, etc.

BRIEF SUMMARY OF THE INVENTION

A mobile terminal consistent with the invention is provided with a processor circuit configured to identify an approximate geographic position of the mobile terminal by accessing a database including data representing a plurality of geographic positions. The approximate position corresponds to one of the geographic positions in the database associated with data representing a current cell identification number for a cell in which the mobile terminal is located.

A communication system consistent with the invention includes a radio network having a plurality of base stations, each base station serving a cell in the radio network; a database including data representing a plurality of geographic positions; and a mobile terminal configured to receive communication signals from the radio network. The communication signals include data representing a current cell identification number corresponding to an associated cell in which the mobile terminal is located. The mobile terminal is configured to identify an approximate geographic position of the mobile terminal by accessing the database. The approximate position corresponds to one of the geographic positions associated in the database with data representing the current cell identification number. In another embodiment, a location server configured to communicate with the mobile terminal through the radio network may be configured to identify the approximate geographic position.

A method of determining the geographic location of a mobile terminal consistent with the invention includes: creating a database including data representing a plurality of geographic positions; identifying a current cell identification number corresponding to a cell in which the mobile terminal is located; and determining the geographic location based on data including at least one of the geographic positions associated in the database with data representing the current cell identification number.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION OF THE INVENTION

Figure 1:
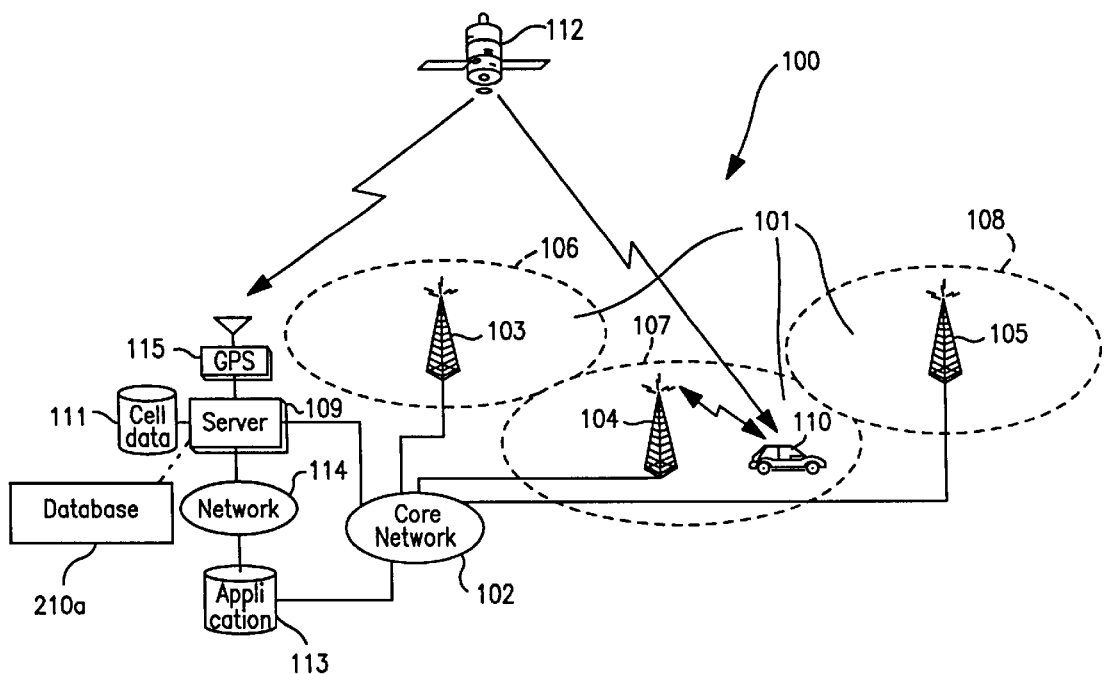
FIG. 1 is a block diagram of an exemplary system consistent with the present invention.

With reference to FIG. 1, there is illustrated an exemplary system 100 for locating a mobile terminal 110 consistent with the present invention. For ease of explanation and to convey its mobility, the mobile terminal 110 is graphically represented in FIG. 1 by an illustration of an automobile. It is to be understood, however, that the term "mobile terminal", as used herein, may include a cellular radiotelephone with or without a multi-line display; a Personal Communications Systems (PCS) terminal that may combine a cellular radiotelephone with data processing, facsimile and data communications capabilities; a PDA that can include a radiotelephone, pager, Internet/intranet access, Web browser, organizer, calendar and/or a positioning receiver, such as a GPS receiver; and a conventional laptop and/or palmtop receiver or other appliance that includes a radiotelephone transceiver.

Also, it should be understood that the principles of the present invention may be applied to any cellular or wireless system utilizing air interfaces, such as GSM, TDMA, CDMA or FDMA. It should further be understood that the principles of the present invention may be utilized in hybrid systems that are combinations of two or more of the above air interfaces. In addition, a mobile terminal, in accordance with the present invention, may be designed to communicate with a base station transceiver using any standard based on GSM, TDMA, CDMA, FDMA, a hybrid of such standards, or any other standard.

As shown, a system 100 consistent with the invention may include a radio network comprising a core network 102 and a radio access network (RAN) 101. The RAN 101 may include a collection of base stations 103, 104,105, each of which serves a region or cell 106, 107, 108, respectively, in the network 101. An example of such a network is a cellular telephone network, including commercially operational networks based on well-known industry standards such as GSM, TDMA or CDMA.

As will be described in greater detail below, a location server 109 in the radio network may provide aiding data to the positioning-enabled mobile terminal 110. This aiding data may be, for example, data indicating the current cell in which the mobile terminal is positioned. Other types of aiding data, e.g. satellite ephemeris, time estimates, etc. may also be provided. The data may be provided to improve the performance of the mobile terminal 110, such as reducing time-to-first-fix (TTFF), or increasing the sensitivity of the mobile terminal 110 so that signals from the positioning satellite 112 (e.g. a GPS satellite) may be aquired by the mobile terminal in difficult radio propagation environments.

Providing a position of the current cell of the mobile terminal 110 is helpful in this regard, even if the position is relatively inaccurate (e.g. the geographical coordinates of the base station).

The location server 109 may capture the aiding data from a variety of sources, e.g. a GPS receiver 115 that is accessible through a network or locally attached, as shown in FIG. 1. The server 109 may have access either locally or through a network to a database 111 containing cell position information, which it delivers as aiding data based on the unique identity of the current cell in which the requesting mobile terminal 110 resides.

A positioning application 113, which may be a software program that is external to the mobile terminal 110, may be provided either within or outside of the radio network. An example of a positioning application is a location-dependent information service (e.g. for locating the nearest restaurant). Those skilled in the art will recognize a variety of system architectures for employing a positioning application. In one embodiment of the invention, for example, one or more positioning applications may execute on one or more application servers. If the positioning application 113 resides outside of the network, it may communicate with the core network 102 through a particular gateway. In addition, the application 113 may also communicate with the location server 109 either through the core network 102 or through an external network 114.

Figure 2:
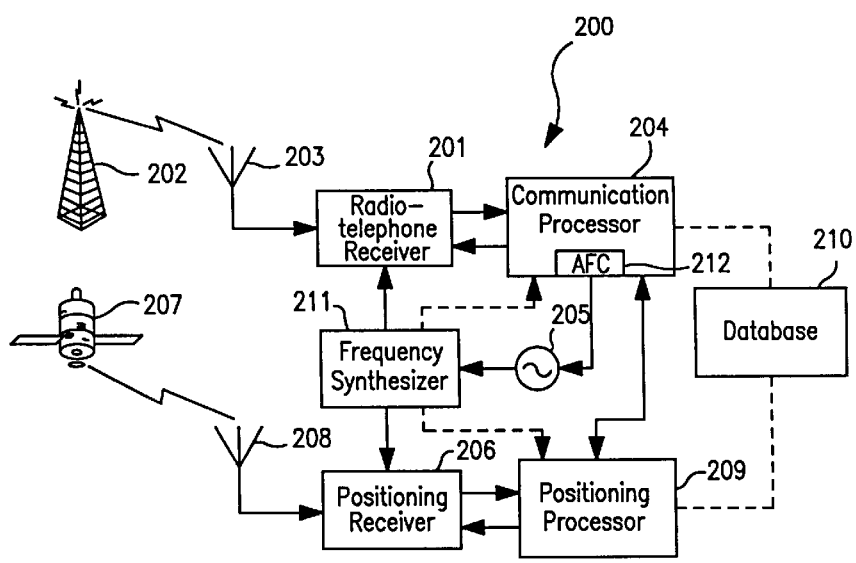
FIG. 2 is a block diagram of an exemplary mobile terminal consistent with the present invention.

Turning now to FIG. 2, there is provided a block diagram of an exemplary mobile terminal 200 consistent with the invention. For ease explanation, the illustrated mobile terminal 200 comprises a radiotelephone and positioning receiver in combination. Those skilled in the art will recognize, however, that other functional elements may be included in a mobile terminal consistent with the invention. For example, a mobile terminal consistent with the invention may also include a radiotelephone transmitter.

A radiotelephone portion of the terminal may include a radiotelephone receiver 201, which receives information-bearing signals from, for example, a radio network 202 via an antenna 203. The radiotelephone receiver 201 may utilize a well-known superheterodyne or homodyne architecture. Those skilled in the art will recognize, however, that a variety of receiver types may be incorporated into an embodiment consistent with the invention.

In the illustrated exemplary embodiment, the radiotelephone receiver 201 filters and translates the information-bearing signal to center its frequency spectrum at a low, or zero, frequency. This signal may then be coupled to a communication processor (CoP) 204 in sampled and quantized format. The CoP 204 may extract the information from the signal and process it consistent with the type of information carried therein, e.g. speech or data. Optionally, the CoP 204 may utilize an automatic frequency control (AFC) 212 to adjust the receiver's frequency reference 205 (in the embodiment shown, a temperature-controlled crystal oscillator) in order to keep it tuned to the desired channel.

A positioning section of the mobile terminal 200 contains a positioning receiver 206, which may receive positioning signals from a plurality of positioning signal sources 207 via an antenna 208. While one or more GPS satellites, as shown in FIG. 2, are one example of a positioning signals source, it is understood by those skilled in the art that the positioning receiver may also receive positioning signals from the location server, other satellite or terrestrial positioning systems, or a combinations thereof. Also, the positioning receiver 206 may have many different embodiments, including the well-known superheterodyne and homodyne architectures.

The down-converted signal from the positioning receiver 206 may be coupled to a positioning processor (PoP) 209 in sampled and quantized format. The PoP 206 processes these signals to generate the measurements required to compute a position estimate. In a GPS receiver embodiment, this may involve correlating the incoming signal with pseudonoise (PN) codes to determine time-of-transit from the respective GPS satellites to the receiver 206.

A frequency synthesizer 211 may be provided for locking the synthesized frequencies of the CoP 204 and/or the PoP 209 to the frequency reference signal 205. In the embodiment shown, the frequency synthesizer 211 is capable of providing a multiplicity of local oscillators from a single reference source, such that the local oscillator signals are simultaneously provided for several concurrent operations (e.g. telephone signal reception and transmission and GPS signal reception).

The CoP 204 may include a processing unit, such as a microprocessor or digital signal processor, and one or more memories used to store software executed by the processor. Typical embodiments include non-volatile memory containing the executable program and fixed data values, and volatile random access memory (RAM) containing variable data values stored and used by the program. In one embodiment of the present invention, the CoP 204 is capable of updating the data values in non-volatile memory, such as flash memory. The PoP 209 may have the same architecture as the CoP 204, or, alternatively, the PoP 209 and the CoP 204 may be merged and share common program and/or data memories.

In the illustrated embodiment, a location database 210, i.e. a digital record that is stored in a volatile or non-volatile memory, is included for storing location information, which may be retrieved and utilized by the PoP 209 and/or the CoP 204. While the database 210 in FIG. 2 is shown as being external to the PoP 209 and the CoP 204, the database may be stored in the memory of either the PoP 209 or the CoP 204, as well as in a memory circuit peripheral to both of these processor units but accessible by one or both processors. An example of one such memory circuit is a Subscriber Identity Module (SIM) used in Global system for Mobile Communications (GSM) cellular phones.

The databases includes data representing a plurality of geographic positions, each of which may be indexed by one or more cell identification numbers (cell-IDs). Due to the general limitation of resources in a GPS mobile terminal, which is typically designed to minimize complexity to be a commercially viable consumer product, the database may be of finite size and relatively small with respect to the number of cells in radio networks worldwide. Of course, the database may be more comprehensive if size and cost considerations are not present. Also, position information may be stored in a variety of formats, including Cartesian earth-centered earth-fixed (ECEF) coordinates or latitude/longitude/altitude.

Figure 3:
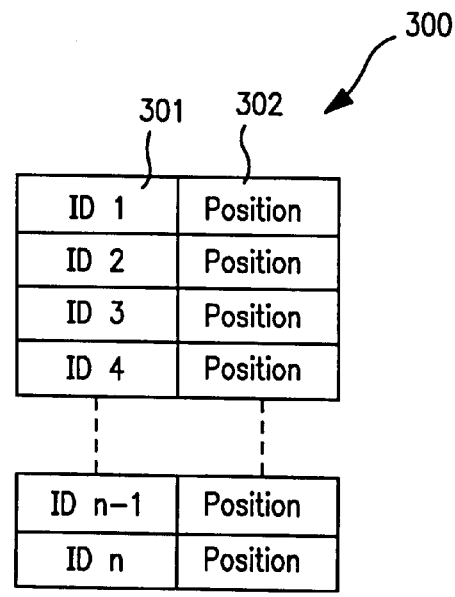
FIG. 3 is a graphical representation of an exemplary database consistent with the present invention.

FIG. 3 schematically illustrates an exemplary embodiment 300 of a database 210 consistent with the present invention. In the illustrated embodiment, the database 300 comprises a plurality of entries, each entry directly mapping a given position 302 of the mobile terminal to a cell-ID 301. The current cell-ID may be provided to the database by the mobile terminal, and the position 302 may be provided through the positioning processor, e.g. processor 209. Each time the positioning processor computes a position, the cell-ID of the current cell may be combined with the position and stored in the database 300. Also, instead of updating the database at every position fix, caching strategies such as least recently used (LRU), first-in first-out (FIFO), and random discard may be used to keep the size of the database within a boundary, thereby conserving database resources.

The frequency of database updates may also be reduced in a number of other ways. Prior to each update of the database, for example, the processor accessing the memory where the database 210 is stored, e.g. the PoP 209 or the CoP 204, may check the database for the existence of an entry for the current cell-ID. If an entry already exists for the current cell-ID, then no update may be made. Since positions are typically only approximate, any valid position for a given cell-ID may be presumed to be as accurate as any other.

In another embodiment, the processor may fill the database with entries for each unique cell-ID encountered until it is full. After the database is full, the processor may not overwrite existing entries. With enough entries, the database will be adequate for normal usage by many GPS mobile terminal users, with the exception of highly mobile users. Also, the processor may add a database entry only if the geographic distance for the current cell-ID is more than a predefined distance from locations of existing entries.

Figure 4:
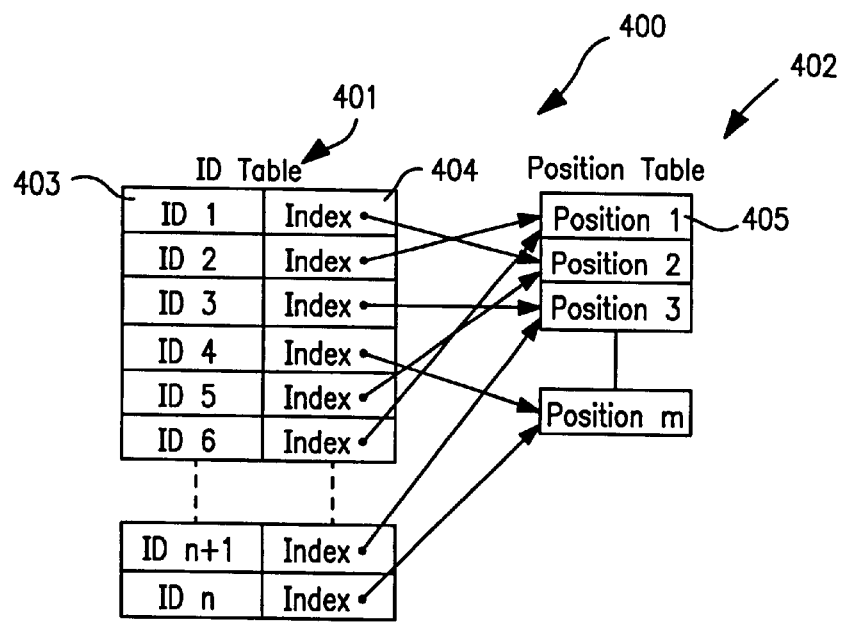
FIG. 4 is a graphical representation of another exemplary database consistent with the present invention.

Another embodiment 400 involving the use of "one-to-many" relationships, is illustrated in FIG. 4. As shown, the database 400 is divided into two tables: the position table 402, which contains a plurality of mobile terminal positions 405; and the ID table 401, which contains a plurality of cell-IDs 403 and a plurality of indices 404 into the position table 402. Many cell-IDs 403 are thus associated with a relatively small number of positions 405, thereby exploiting the assumption that the required accuracy for the estimated position is larger than the area covered by a cell-ID.

The exemplary database 400 makes efficient use of limited database storage space, for example, in the event a position element 405 is large in relation to an index 404. The proportion of space between the two tables should be selected based on average expected cell size, position accuracy requirements, available database space, and the amount of space required to hold entries for each of the tables. While LRU, FIFO and other caching strategies are still applicable in this embodiment, purging entries and maintaining database consistency is more complicated due to the "one-to-many" relationships. Thus, in view principle that removing the minimum number of links retains the maximum amount of information, one approach would be to select deletions based upon the minimum number of links for an entry in the position table 402. Consistent with this approach, the processor would check the database 400 for consistency between tables each time an entry deletion occurs in either table, ensuring that the processor maintains data most likely to be needed when the mobile terminal moves about a localized area.

Figure 5:
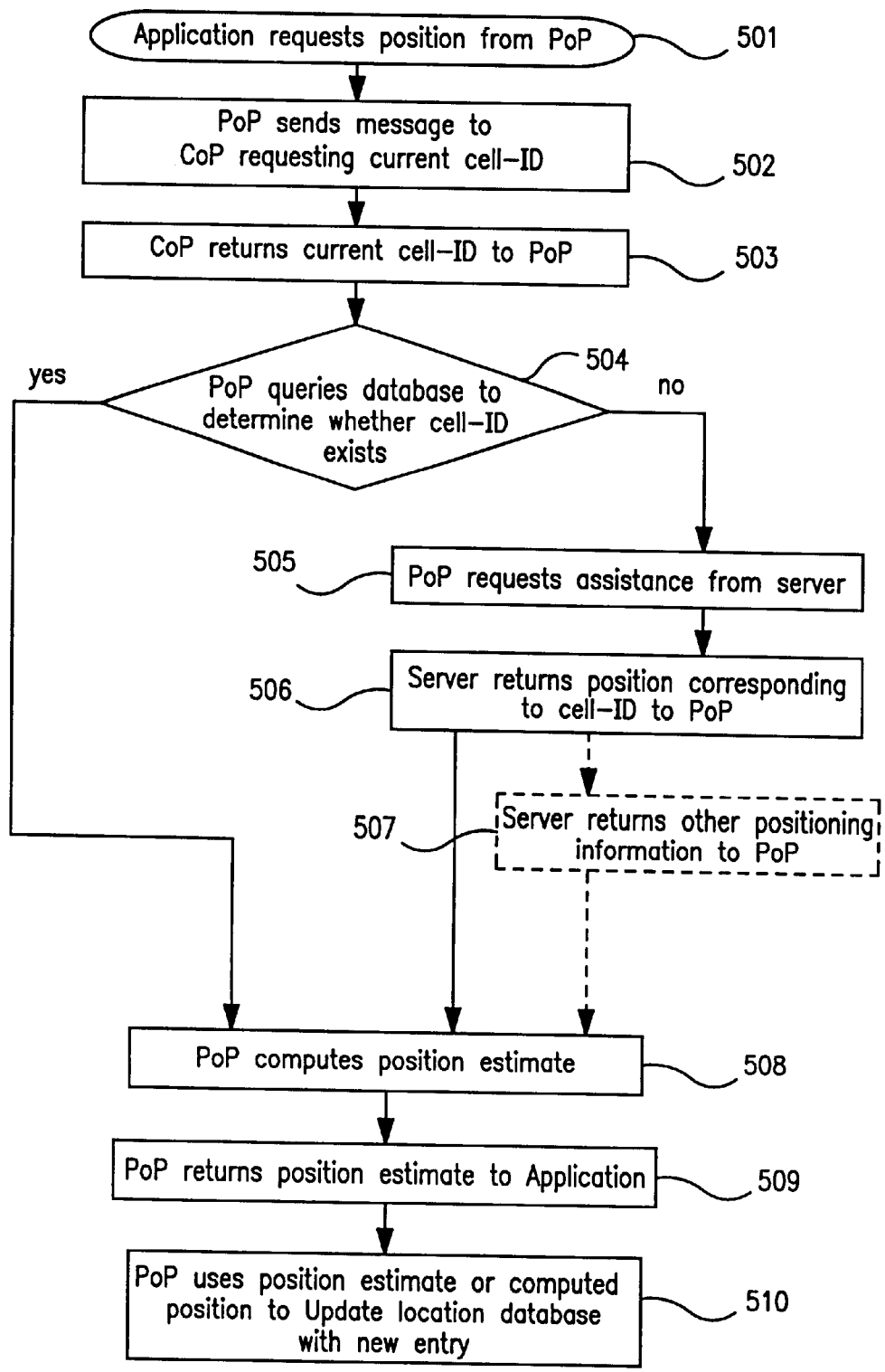
FIG. 5 is a flowchart illustrating operation of exemplary system consistent with the present invention.

Turning now to FIG. 5, there is shown the process flow for an exemplary system consistent with the present invention. As shown, the process is initiated by a request for position from an application 501, e.g. a positioning application such as a location-dependent information service. The application may request the position 501 directly from the PoP, transparent to the CoP. After receiving the request, the PoP sends a message 502 to the CoP requesting the identity of the current radio network cell serving the mobile terminal. The CoP responds 503 with the current cell-ID information, and the PoP checks its location database 504 to determine if it contains a position entry matching the cell-ID identified by the CoP.

If the database contains a position entry matching the current cell-ID, the PoP utilizes the position entry to compute a current position estimate 508, e.g. using position information from a positioning satellite. The PoP may also use other information (e.g. satellite orbits and/or time estimate) in computing a position estimate. Once the current position estimate is calculated, the PoP returns 509 it to the requesting application 509. The PoP also updates 510 the database with the calculated position estimate to provide the database with a new position entry for the associated cell-ID.

If there is no position entry in the database corresponding to the current cell-ID, the PoP may request assistance 505 from a location server, e.g. server 109, which responds 506 with a position corresponding to the cell-ID specified in the request from the PoP. The server may respond with other information 507, such as the location of positioning signal sources, e.g. orbits of GPS satellites. The PoP then utilizes this information for the current position calculation 508, the result of which is returned 509 by the PoP to the application and provided 510 to the database to provide and entry for the cell-ID.

Figure 6:
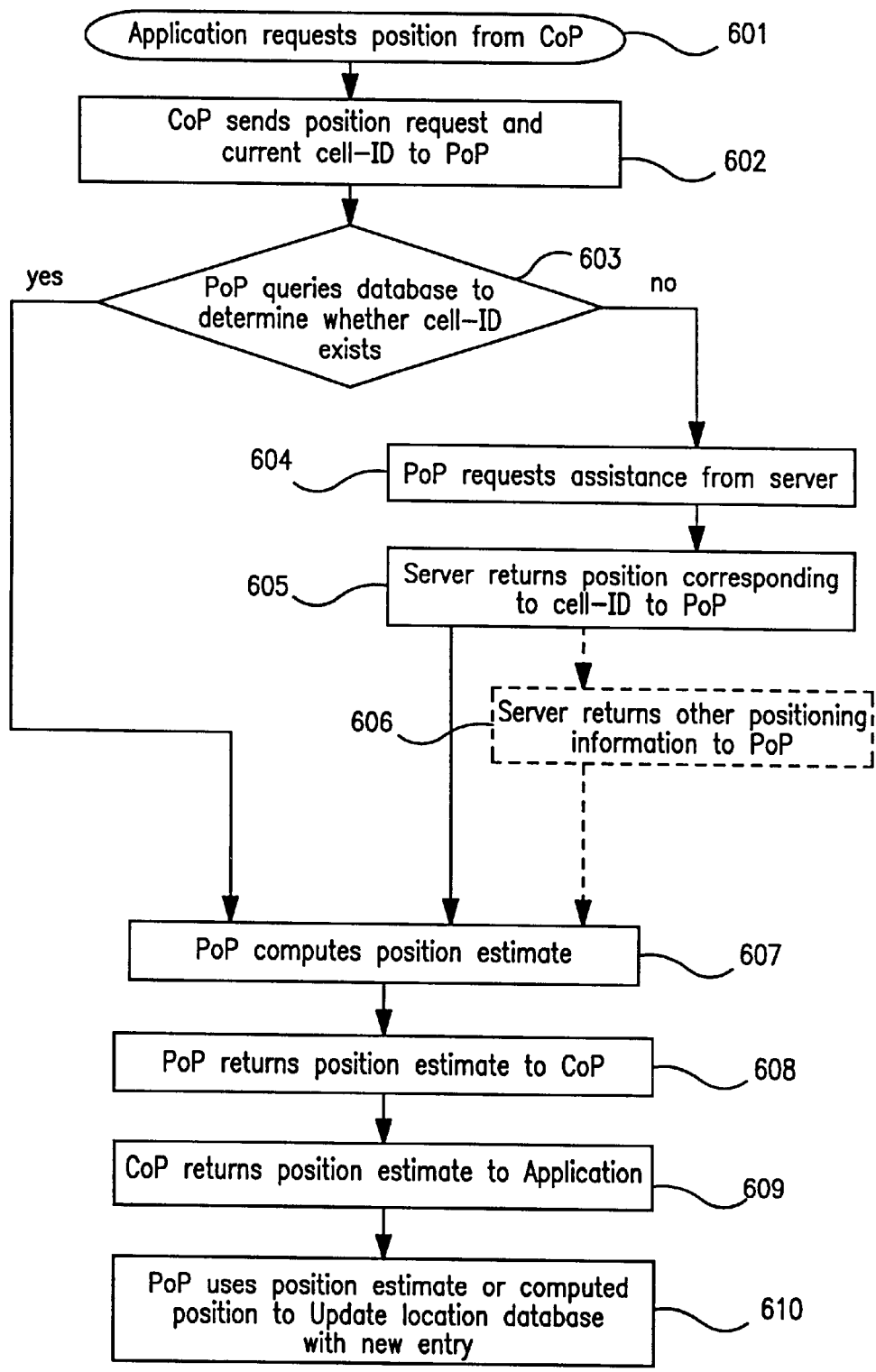
FIG. 6 is a flowchart illustrating operation of another exemplary system consistent with the present invention.

FIG. 6 illustrates the process flow in another exemplary embodiment consistent with the invention in which the position request from the application is provided to the CoP. Those skilled in the art will recognize a number of applications for such an embodiment. One example would be an application including a protocol between the mobile terminal and the radio network that is executed by the CoP and includes the capability for query and response of position information.

In the illustrated exemplary embodiment, the application requests a position directly from the CoP 601. The CoP passes the request 602 along with the identity of the current cell to the PoP. The PoP checks its location database 603 to determine if it contains an entry matching that cell-ID. If the database contains a position entry matching the current cell-ID, the PoP utilizes the position entry to compute a current position estimate 607, which it returns 608 to the CoP. As discussed above, the position estimate may be calculated based on position information derived from a positioning satellite, and using other information, such as satellite orbits or time estimates. The CoP returns 609 the calculated position estimate to the requesting application, and the PoP updates 610 the database with the calculated position estimate to provide the database with a new position entry for the associated cell-ID.

If there is no entry in the database corresponding to the current cell-ID, then the PoP may request assistance 604 from a location server, e.g. server 109, which responds 605 with a position corresponding to the cell-ID specified in the request from the PoP. The server may also respond with further information 606, such as the location of positioning signal sources, e.g. orbits of GPS satellites. The PoP then utilizes this information to compute 607 a current position estimate. The PoP returns 608 the position estimate to the CoP, which, in turn, returns 609 the position estimate to the requesting application. The PoP also uses this position estimate or computed position to update its location database 610 with a new position entry.

As discussed above, the location database 210 may reside in the mobile terminal, i.e. it may be stored in the memory of either the PoP 209 or the CoP 204, as well as in a memory circuit peripheral to both of these processors. Interactions between the elements similar to those described above might take place in an alternate embodiment, in which the cell-indexed location database is stored in the CoP. Thus, as the mobile terminal user roams about the radio network, a cell-indexed location database capable of aiding in position computation is built and updated.

The PoP (or the CoP, if it holds the database) may be configured to obtain an initial position estimate from an external source (e.g. server), even if it has a database entry for the current cell. For example, if a one-to-many structure is employed in the database, a single stored location may not provide sufficient location information. The PoP may also be configured to elect to update and refine the reference location associated with a particular cell-ID by determining the most likely location of the mobile terminal in the cell, such as by averaging multiple position results computed in that cell.

A variety of additional embodiments or combination of embodiments are possible. For example, instead of the mobile terminal requesting assistance from a location server, as illustrated in FIGS. 5 and 6, the mobile terminal may instead compute the position on its own, e.g. in the PoP, using one or more positioning signal sources, without assistance from a location server. The computed position would be written into the database to a position corresponding to the cell ID.

Also, the CoP may be configured to routinely notify the PoP when the mobile terminal is "handed off" to a new cell, or at a predetermined time interval thereafter. In this configuration, the PoP may then compute its own position using one or more positioning signal sources, without assistance from a location server, and the position may be written into the database next to the new cell ID. This embodiment would require that the mobile terminal have sufficient hysterisis in its cell-handoff algorithm to ensure that the position computed by the mobile terminal corresponds to the correct cell. In another possible embodiment, the PoP may compute the position on its own periodically, at a predetermined time interval, using one or more positioning signal sources, without assistance from a location server.

Turning again to FIG. 1, a location database 210a may accessible and developed by the server, rather than the mobile terminal. While the database 210a in FIG. 1 is shown as being external to the server 109, the database may be stored in the memory of the server 109, as well as in a memory circuit peripheral to server but accessible to the server. An example of one such memory circuit is a Subscriber Identity Module (SIM) used in Global System for Mobile Communications (GSM) cellular phones.

Figure 7:
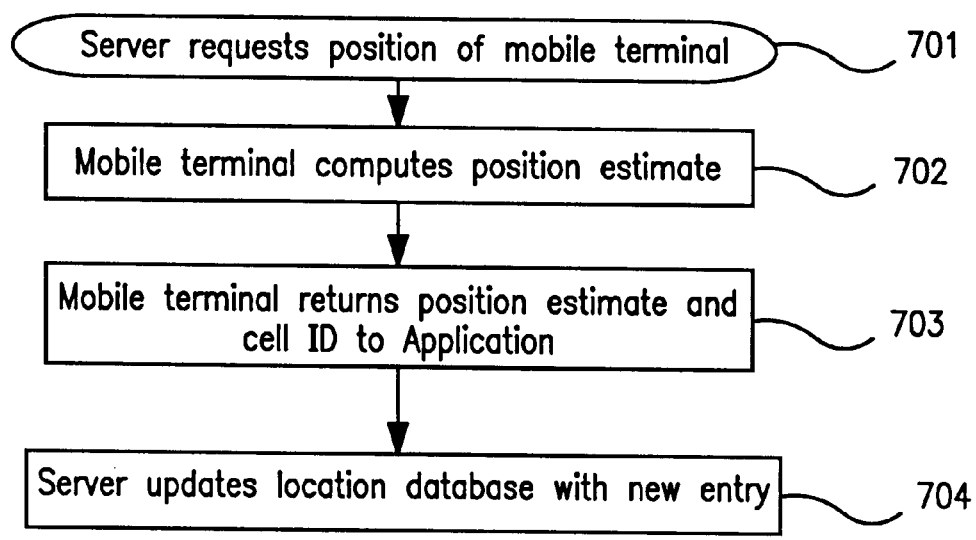
FIG. 7 is aflowchart illustrating operation of yet another exemplary system consistent with the present invention.

FIG. 7 illustrates the operation of an exemplary embodiment wherein the database 210a is developed in a memory that is directly accessible by the server. In such an embodiment, a server requests 701 the position of the mobile terminal. The mobile terminal computes 702 a position estimate, and returns 703 the position estimate and identity of the current cell with which it is communicating. The server then stores 704 this information in its memory, which it can then use to assist other mobile terminals calling from that cell. As subsequent mobile terminals respond with other positions related to the particular cell, the server may refine its estimate of the centroid of the cell relative to call locations, for example, by averaging positions received from multiple mobile terminals. This continually refined position estimate may be fed back to mobile terminals requesting assistance while in that cell. A method consistent with this embodiment thus allows a server to provide position assistance without having prior information regarding base station locations in the network.

Those skilled in the art will recognize that the present invention may be embodied as cellular communication systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). It is noted that the computer-usable or computer-readable memory could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A mobile terminal comprising:
   a positioning receiver; and
   a processor circuit configured to identify an approximate geographic position of said mobile terminal by accessing a database comprising data representing a plurality of geographic positions provided by said positioning receiver, said approximate position corresponding to one of said geographic positions associated in said database with data representing a current cell identification number for a cell in which said mobile terminal is located.

2. A mobile terminal according to claim 1, wherein said is database stored in said mobile terminal.

3. A mobile terminal according to claim 1, wherein said processor is configured to compute a current geographic position based on data comprising said approximate position.

4. A mobile terminal according to claim 3, wherein said processor is configured to update said database with said current geographic position, said current geographic position being associated in said database with said current cell identification number.

5. A mobile terminal according to claim 3, wherein said processor is configured to compute said current geographic position at a predefined time interval.

6. A mobile terminal according to claim 3, wherein said processor is configured to compute said current geographic position when mobile terminal moves from a first cell to a second cell.

7. A mobile terminal according to claim 1, wherein said processor is configured to compute a current geographic position based on data comprising said approximate position and a positioning signal from a positioning signal source.

8. A mobile terminal according to claim 7, wherein said positioning signal source is a location server for a radio network communicating with said mobile terminal.

9. A mobile terminal according to claim 7, wherein said positioning signal source is a positioning system satellite.

10. A mobile terminal according to claim 9, wherein said satellite is a GPS satellite.

11. A mobile terminal according to claim 1, wherein said database employs a caching strategy.

12. A mobile terminal according to claim 11, wherein said caching strategy is selected from the group consisting of: least recently used, first-in first-out, and random discard.

13. A mobile terminal comprising:
   a communication processor circuit configured to determine a current cell identification number for a cell in which said mobile terminal is located;
   a positioning receiver comprising a positioning processor circuit;
   a database comprising data representing a plurality of geographic positions provided by said positioning receiver;
   said positioning processor further configured to identify an approximate geographic position of said mobile terminal, said approximate position corresponding to one of said geographic positions associated in said database with data representing said current cell identification number.

14. A mobile terminal according to claim 13, wherein said positioning processor is configured to compute a current geographic position based on data comprising said approximate position.

15. A mobile terminal according to claim 14, wherein said positioning processor is configured to update said database with said current geographic position, said current geographic position being associated in said database with said current cell identification number.

16. A mobile terminal according to claim 14, wherein said positioning processor is configured to compute said current geographic position at a predefined time interval.

17. A mobile terminal according to claim 14, wherein said positioning processor is configured to compute said current geographic position when mobile terminal moves from a first cell to a second cell.

18. A mobile terminal according to claim 13, wherein said positioning processor is configured to compute a current geographic position based on data comprising said approximate position and a positioning signal from a positioning signal source.

19. A mobile terminal according to claim 18, wherein said positioning signal source is a location server for a radio network communicating with said mobile terminal.

20. A mobile terminal according to claim 18, wherein said positioning signal source is a positioning system satellite.

21. A mobile terminal according to claim 20, wherein said satellite is a GPS satellite.

22. A mobile terminal according to claim 13, wherein said database employs a caching strategy.

23. A mobile terminal according to claim 22, wherein said caching strategy is selected from the group consisting of: least recently used, first-in first-out, and random discard.

24. A communication system comprising:
   a radio network comprising a plurality of base stations, each said base station serving a cell in said radio network;
   a mobile terminal comprising a positioning receiver, said mobile terminal configured to receive communication signals from said radio network, said communication signals comprising data representing a current cell identification number corresponding to an associated one of said cells in which said mobile terminal is located; and
   a database comprising data representing a plurality of geographic positions provided by said positioning receiver;
   said mobile terminal being configured to identify an approximate geographic position of said mobile terminal by accessing said database, said approximate position corresponding to one of said geographic positions associated in said database with data representing said current cell identification number.

25. A system according to claim 24, wherein said database is stored in said mobile terminal.

26. A system according to claim 24, said system further comprising a location server configured to communicate with said mobile terminal through said radio network, said server storing positioning data and being adapted for selectively transmitting said positioning data to said mobile terminal.

27. A system according to claim 24, wherein said mobile terminal is configured to compute a current geographic position based on data comprising said approximate position.

28. A system according to claim 27, wherein said mobile terminal is configured to update said database with said current geographic position, said current geographic position being associated in said database with said current cell identification number.

29. A system according to claim 27, wherein said processor is configured to compute said current geographic position at a predefined time interval.

30. A system according to claim 27, wherein said processor is configured to compute said current geographic position when mobile terminal moves from a first cell to a second cell.

31. A system according to claim 24, wherein said system further comprises at least one positioning signal source, and wherein said mobile terminal is configured to compute a current geographic position based on data comprising said approximate position and a positioning signal from said positioning signal source.

32. A system according to claim 31, wherein said positioning signal source is a location server configured to communicate with said mobile terminal through said radio network.

33. A system according to claim 31, wherein said positioning signal source is a positioning system satellite.

34. A system according to claim 33, wherein said satellite is a GPS satellite.

35. A system according to claim 24, wherein said database employs a caching strategy.

36. A system according to claim 35, wherein said caching strategy is selected from the group consisting of: least recently used, first-in first-out, and random discard.

37. A communication system comprising:
   radio network comprising a plurality of base stations, each said base station serving a cell in said radio network;
   a mobile terminal comprising a positioning receiver and configured to receive communication signals from said radio network, said communication signals comprising data representing a current cell identification number corresponding to an associated one of said cells in which said mobile terminal is located;

a database comprising data representing a plurality of geographic positions provided by said positioning receiver; and a location server configured to communicate with said mobile terminal through said radio network and to identify an approximate geographic position of said mobile terminal by accessing said database, said approximate position corresponding to one of said geographic positions associated in said database with data representing said current cell identification number.

38. A system according to claim 37, wherein said mobile terminal is configured to compute a current geographic position based on data comprising said approximate position.

39. A system according to claim 38, wherein said server is configured to update said database with said current geographic position, said current geographic position being associated in said database with said current cell identification number.

40. A system according to claim 38, wherein said mobile terminal is configured to compute said current geographic position at a predefined time interval.

41. A system according to claim 38, wherein said mobile terminal is configured to compute said current geographic position when mobile terminal moves from a first cell to a second cell.

42. A system according to claim 37, and wherein said mobile terminal is configured to compute a current geographic position based on data comprising said approximate position and a positioning signal from a positioning signal source.

43. A system according to claim 42, wherein said positioning signal source is a positioning system satellite.

44. A system according to claim 43, wherein said satellite is a GPS satellite.

45. A system according to claim 37, wherein said database employs a caching strategy.

46. A system according to claim 45, wherein said caching strategy is selected from the group consisting of: least recently used, first-in first-out, and random discard.

47. A method of determining the geographic location of a mobile terminal comprising:

creating a database comprising data representing a plurality of geographic positions provided by a positioning receiver of said mobile terminal;

identifying a current cell identification number corresponding to a cell in which said mobile terminal is located; and determining said geographic location based on data comprising one of said geographic positions associated in said database with data representing said current cell identification number.

48. A method according to claim 47, wherein said database is stored in said mobile terminal.

49. A method according to claim 47, wherein said database is stored in a location server configured to communicate with said mobile terminal through a radio network.

50. A method according to claim 47, wherein said current cell identification number is identified based on data received by said mobile terminal from a radio network.

51. A method according to claim 47, wherein said geographic position is determined by a processor in said mobile terminal.

52. A method according to claim 47, wherein said geographic position is determined by a location server configured to communicate with said mobile terminal through a radio network.

53. A method according to claim 47, wherein said data further comprises a positioning signal from a positioning signal source.

54. A method according to claim 53, wherein said positioning signal source is a location server configured to communicate with said mobile terminal through a radio network.

55. A method according to claim 53, wherein said positioning signal source is a positioning system satellite.

56. A method according to claim 55, wherein said satellite is a GPS satellite.

57. A method according to claim 47, wherein said data further comprises data selected from the group consisting of satellite orbits, time estimates, and ephemeris.

58. A method according to claim 47, said method further comprising: updating said database with said geographic location.

59. A method according to claim 47, wherein said database employs a caching strategy.

60. A method according to claim 59, wherein said caching strategy is selected from the group consisting of: least recently used, first-in first-out, and random discard.

61. A method according to claim 47, wherein said geographic location is determined at a predefined time interval.

62. A method according to claim 47, wherein said geographic location is determined when said mobile terminal moves from a first cell to a second cell.

* * * * *